United States Patent
Altenrenger et al.

(10) Patent No.: US 6,863,254 B2
(45) Date of Patent: Mar. 8, 2005

(54) VALVE CONTROL UNIT

(75) Inventors: Urban Altenrenger, Ingolstadt (DE);
Markus Binder, Koesching (DE);
Georg Dorfinger, Geimersheim (DE);
Richard Hoffmann, Geimersheim
(DE); Willy Kring, Ingolstadt (DE);
Klaus Schirmer, Ingolstadt (DE);
Roberto Schlenker, Ingolstadt (DE)

(73) Assignee: Conti Temic microelectronic GmbH, Nuremburg (DE)

( * ) Notice: Subject to any disclaimer, the term of this patent is extended or adjusted under 35 U.S.C. 154(b) by 0 days.

(21) Appl. No.: 10/428,979

(22) Filed: May 1, 2003

(65) Prior Publication Data

US 2004/0069965 A1 Apr. 15, 2004

Related U.S. Application Data

(63) Continuation of application No. 09/867,722, filed on May 29, 2001, now abandoned.

(30) Foreign Application Priority Data

May 30, 2000 (DE) .......................................... 100 26 570

(51) Int. Cl.[7] .............................................. B60T 13/66
(52) U.S. Cl. ................................ 251/129.09; 303/119.3
(58) Field of Search ....................... 251/129.15, 129.09;
303/119.2, 119.3; 335/278

(56) References Cited

U.S. PATENT DOCUMENTS

| | | |
|---|---|---|
| 3,593,240 A | 7/1971 | Garczynski |
| 4,843,361 A | 6/1989 | Couvreur et al. |
| 5,040,853 A | 8/1991 | Burgdorf et al. |
| 5,275,478 A | 1/1994 | Schmitt et al. |
| 5,280,873 A | 1/1994 | Abrahamsen et al. |
| 5,374,114 A | 12/1994 | Burgdorf et al. |
| 5,386,337 A | 1/1995 | Schoettl |
| 5,449,227 A | 9/1995 | Steinberg et al. |
| 5,462,344 A * | 10/1995 | Jakob et al. .............. 303/119.3 |
| 5,513,905 A * | 5/1996 | Zeides et al. ............. 303/119.3 |
| 5,520,447 A * | 5/1996 | Burgdorf et al. .......... 303/119.3 |
| 5,662,392 A * | 9/1997 | Hinz ......................... 303/119.2 |
| 5,681,099 A * | 10/1997 | Steffes et al. ............. 303/119.2 |
| 5,749,060 A * | 5/1998 | Graf et al. ..................... 701/53 |
| 5,808,534 A | 9/1998 | Laffey |
| 5,820,228 A * | 10/1998 | Schneider et al. ........ 303/119.3 |
| 5,977,852 A * | 11/1999 | Schoettl ....................... 335/278 |
| 5,988,770 A * | 11/1999 | Volz ......................... 303/119.3 |
| 6,059,382 A | 5/2000 | Schoettl |
| 6,065,734 A | 5/2000 | Tackett et al. |
| 6,086,043 A | 7/2000 | Hoffelder |

FOREIGN PATENT DOCUMENTS

| | | |
|---|---|---|
| DE | 3823493 | 1/1989 |
| DE | 4001017 | 7/1991 |
| DE | 4100967 | 7/1992 |
| DE | 4133641 | 4/1993 |
| DE | 4201448 | 7/1993 |
| DE | 4232205 | 3/1994 |
| DE | 19505798 | 8/1996 |
| DE | 19640261 | 4/1998 |
| DE | 19532763 | 7/1998 |
| EP | 0499670 | 8/1992 |
| GB | 1377791 | 12/1974 |
| WO | WO 89/10286 | 11/1989 |

* cited by examiner

*Primary Examiner*—Eric Keasel
(74) *Attorney, Agent, or Firm*—W. F. Fasse; W. G. Fasse

(57) ABSTRACT

2.1. Existing valve control devices are set up in housings that feature also the complete yoke in addition to the valve spools.

2.2. In order to reduce the assembly effort required as well as the play of the valve domes on the inside of the spool, yoke arrangements are mounted externally on the housing.

2.3. Such valve control devices are suitable for antilock braking systems, anti-slip control systems, electronic brake servos, and electronic stabilizing programs in motor vehicles.

10 Claims, 3 Drawing Sheets

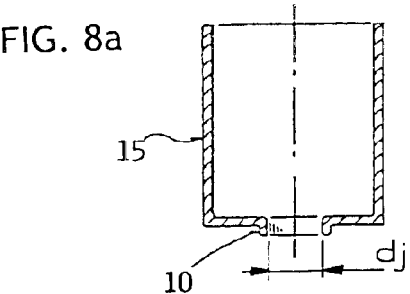
FIG. 8a
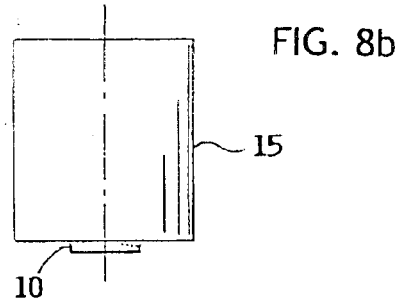
FIG. 8b
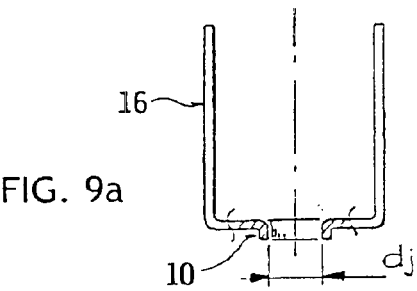
FIG. 9a
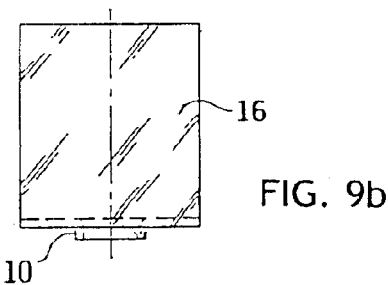
FIG. 9b
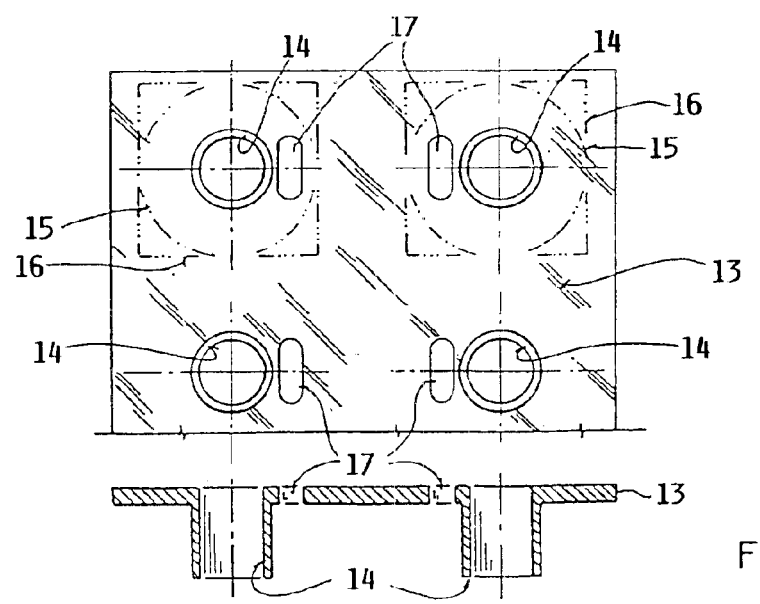
FIG. 10a
FIG. 10b

US 6,863,254 B2

VALVE CONTROL UNIT

CROSS-REFERENCE TO RELATED APPLICATION

This application is a Continuation of U.S. application Ser. No. 09/867,722, filed May 29, 2001 now abandoned.

FIELD OF THE INVENTION

The invention relates to a valve control device, for example, an electronic control unit for an antilock braking system (ABS) in a motor vehicle, where the brake liquid operating the wheel brakes is controlled by means of two valves per wheel. The valves are respectively operated by an electric magnet, i.e. an electromagnetic coil of the valve control device.

BACKGROUND OF THE INVENTION

A known ABS system such as described in EP 0 499 670 A1, features a housing with a housing frame and a cover. In the housing frame, valve coils (also called valve spools herein) are embedded in a yielding fashion. This is effected by positioning the valve spools in their location relative to the housing frame and filling in the spaces with an embedding compound. The component parts of the valve spool such as a wrapped or wound spool body and its surrounding yoke ring are filled in with an embedding compound before being fitted into the housing frame. Then the valve spools are fitted into the housing and fixed into their position by embedding.

The disadvantage here, however, is that several embedding processes are necessary. The compound is not used as a component part of the housing but only for the yielding embedding of the spools. This yielding embedding, in turn, is only used to compensate tolerances if the valve unit is later fitted onto the valve control device. Further housing components are necessary in order to be able to provide a watertight encapsulation of the entire valve control device.

In DE 42 32 205 A1, in a housing frame of the valve control device, the components of a valve spool such as the wrapped spool body, yoke ring, and the valve spool itself will be embedded in yielding fashion by injection moulding with a compound in a single process and then fitted as the housing bottom to a circuit carrier. On the other side, an additional cover is fitted over the circuit carrier so that the valve control device is provided with watertight encapsulation.

The disadvantage with regard to this valve control device is that both the yoke arrangement as well as the spools need to be located within a compound.

The object of the invention is to provide a valve control device that can be manufactured and fitted easily and at low cost, compensates manufacturing tolerances of the valve unit, and thus provides for an easy fitting.

SUMMARY OF THE INVENTION

According to the invention, this object is achieved by a valve control device including a housing preferably of an embedding compound that encloses the control circuit carrier, at least one valve dome of a valve unit, at least one coil (also called a spool herein) that electromagnetically actuates the valve dome to operate the valve unit, and at least one yoke arrangement located over, i.e. at least partially on, around or covering, the coil. In such a valve control device, the yoke arrangement is mounted from the outside of the housing of the valve control device. The yoke arrangement may consist of a single yoke, a yoke group—that is, several interconnected yokes—or yoke components.

The advantages of the invention are that an easy fitting is possible, as the yoke arrangement is mounted only afterwards, that is only after embedding or another process for forming the housing of the valve control device.

Advantageous further embodiments of the invention result from the sub-claims. Here the yoke arrangement can be located movably in relation to the spools, with the material flexibility of the yoke arrangement—as it exists for example in the case of thin sheet metal—being utilized. Here, no movable mounting elements are required. Tolerance compensation with regard to the valve unit is then effected via the flexibility and movability of the yoke arrangement and not exclusively via the diameter of the yoke aperture, through which the valve dome of the valve unit is fed.

BRIEF DESCRIPTION OF THE DRAWINGS

In the following, the invention is to be explained in more detail by means of embodiment examples and the figures. The figures below show:

FIG. 8a: Side view, bell-shaped yoke

FIG. 8b: Front view, bell-shaped yoke

FIG. 9a: Side view, U-shaped yoke

FIG. 9b: Front view, U-shaped yoke

FIG. 10a: Yoke plate, seen from below

FIG. 10b: Cross-section of the yoke plate

DESCRIPTION OF THE PREFERRED EMBODIMENTS

Figure 1:
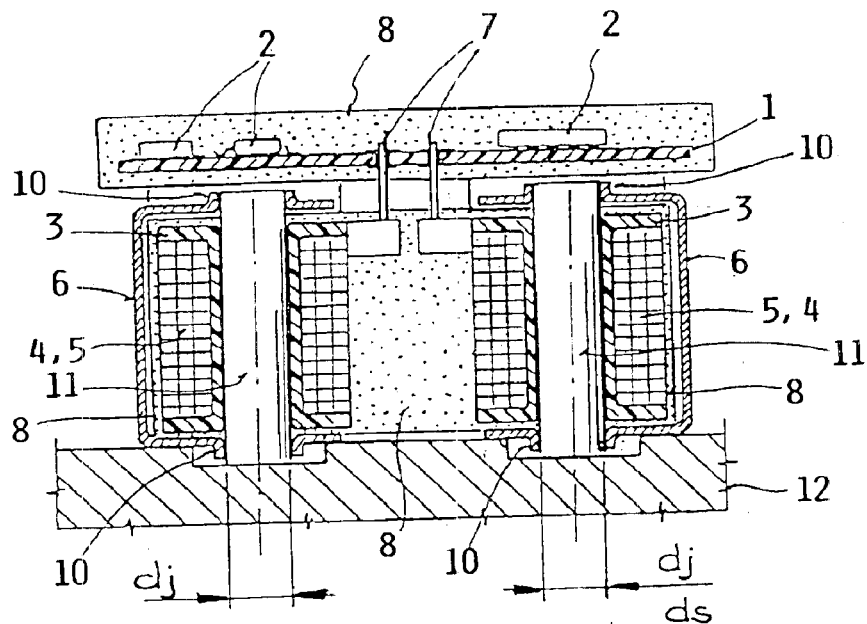
FIG. 1: Valve control device without yoke plate

FIG. 1 shows an embedded valve control device without a yoke plate and with a schematically indicated valve unit 12. An embedding compound 8 forms a housing in that it embeds and encloses a circuit carrier 1, in particular a printed circuit board populated with electronic components 2. At the same time electromagnetic coils 5 (also called spools or valve spools 5 herein) are secured to the circuit carrier 1 via the compound 8. The protective cover or housing consisting of the compound 8 features different thicknesses and solidity in different places. The intermediate space between two coils or spools 5 is completely filled with the compound 8. The remaining spool area, that is the top side of the spool, its bottom and external side, are only covered by a thin coating of the compound 8. The circuit carrier 1 is covered by a somewhat thicker layer of the compound 8. The coils or spools 5 surrounded by the compound, also designated as valve spools, each consist of a spool body 3 and windings 4 and represent the electromagnets by means of which the valves of valve unit 12 are operated via the valve domes 11. The electric spool connections 7, mounted on the side of the spool body 3, protrude into the printed circuit board 1. In this figure, two coils or spools 5 are shown facing each other so that their side-mounted spool connections 7 are located next to one another. This setup is particularly space-saving.

The spools 5 and the circuit carrier 1 are completely embedded by the compound 8, excluding the inside of the spool. In the inside of the spool, the spool body 3 is visible. The diameter $d_s$ on the inside of the spool is so large that it can be used to compensate the manufacturing tolerances during the manufacture of the valve unit, and the valve dome can be inserted easily. The external surfaces of the spool body 3 and the spool windings 4 are positively covered by the compound 8. The resulting housing made of the compound 8 protects all of the embedded components, in particular the electronic components 2, against unfavorable environmental conditions such as e.g. water, humidity, and dust. The embedded components such as the spools 5, the circuit carrier 1, and the electronic components 2 are fixed in position by the compound 8.

In the area between the spools 5 and the circuit carrier 1, recesses are provided into which the yoke 6 can be fitted after embedding. In comparison to the electronic components 2, the yoke 6 is insensitive against environmental influences. It is not embedded but mounted afterwards on the embedded arrangement. The yoke 6, which is pushed sideways over the embedded spool, is designed as a C-shaped yoke and features a rim or bead 10 on its top and bottom sides. Here, within the spool body 3, the beads 10 of the yoke 6 are positioned centrally above the cavity, into which the valve dome 11 is later introduced. The yoke is made of sheet metal and flexible in itself. The inside diameter of the bead 10 of the yoke is therefore smaller than the diameter of the cavity on the inside of the spool body. Due to the narrower yoke diameters $d_j$, the valve domes on the inside of the spool feature a reduced play, and can be more easily introduced into the inner chamber or space of the spool which is overdimensioned for reasons of tolerance. Furthermore, in addition to the valve control device, this figure also shows the hydraulic assembly 12, in particular the valve unit, whose valve domes 11 protrude into the spool body 3.

In order to produce such an embedded valve control device, it makes sense to set up the embedding tool such that it also forms domes that are introduced into the spool body and on which the spools are fixed during the embedding process. Before the embedding process, the spool bodies 3 have been connected with the circuit carrier 1. Here, the connection pins 7 of the spool bodies 3 provide not only the electrical but also the mechanical connection, by means of which the circuit carrier 1 is at least partially positioned within the embedding tool.

Figure 2:
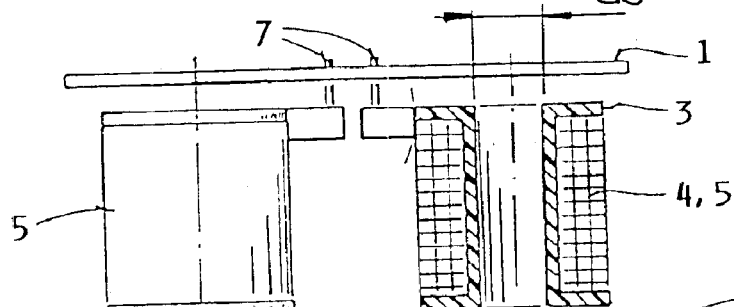
FIG. 2: Spool arrangement

FIG. 2 shows the spool arrangement with the circuit carrier before embedding. The two spools 5 shown here each consist of a spool body 3, on which the spool windings 4 are mounted. The connections 7 of the spools 5 have not been fitted symmetrically with regard to the spool axis but mounted on one side. The spool connections 7 are inserted through the boreholes of the circuit carrier 1, in particular the printed circuit board, and are then fixed in position by means of pressing forces or soldering. They form a fixed unit and can be embedded together. Furthermore, there is a free space between the spools 5 and the printed circuit board 1. The side-mounted connections and the free space are used to create mounting space for the yoke which is not shown in this figure and which is pushed sideways over the spools after embedding.

Figures 3A, 3B:
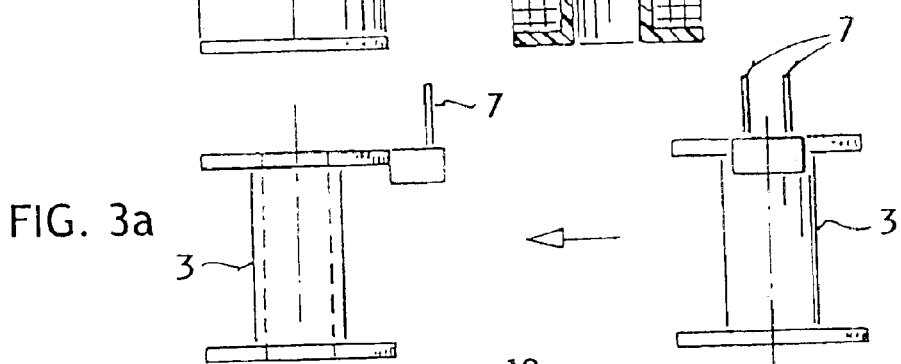
FIG. 3a: Side view, spool body
FIG. 3b: Front view, spool body

The FIGS. 3a and 3b show the spool body, in FIG. 3a as a side view, and in FIG. 3b as a front view. Here, the connections 7 are fed out to one side of the spool body 3. The connections 7 not only have the task to provide an electrical contact between the circuit carrier and the spool, but also support the printed circuit board—as shown in FIG. 2—during the embedding process. For this reason the connections 7 must be dimensioned such that they are sufficiently stable to be able to withstand the press-fitting or soldering processes, and to support the circuit carrier. Moreover, they must be arranged such that they do not obstruct the yoke. The diameter $d_s$ of the cavity in the inside of the spool body 3 must be selected to be sufficiently large so that the permissible tolerances, coming from the arrangement of the valve domes in the valve unit, can be compensated for. This takes account of the fact that the embedded spool bodies with windings will later be arranged in a fixed and immovable position in the compound. The spool body 3 consists of synthetic material.

Figure 4A:
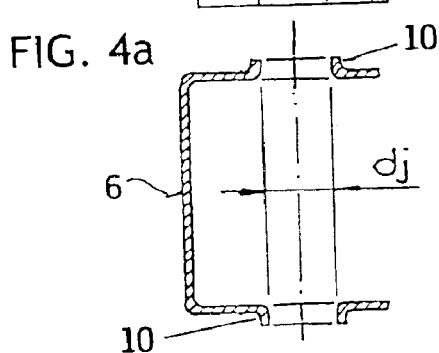
FIG. 4a: Side view, yoke
Figure 4B:
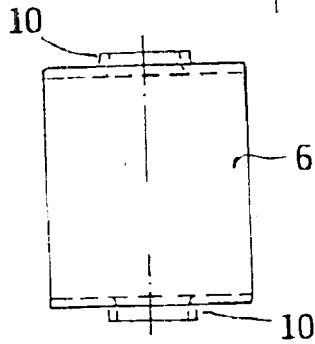
FIG. 4b: Front view, yoke

The FIGS. 4a and 4b show the yoke in different perspectives, in FIG. 4a as a side view, and in FIG. 4b as a front view. As can be seen from the figures, the yoke 6 is designed as a C-shaped yoke and features a bead 10 on its top and bottom sides, into which the valve dome is later inserted. The yoke 6 is pushed over the spool body as shown in FIGS. 3a and 3b. As the yoke 6, which consists of sheet metal, can only be mounted after embedding, this may also be located movably or supported so that the interior diameter $d_j$ of the beads 10 does not need to compensate for all tolerances coming from the arrangement of the valve domes in the valve unit. Tolerance compensation is effected by means of the movability of yoke 6.

Figure 5:
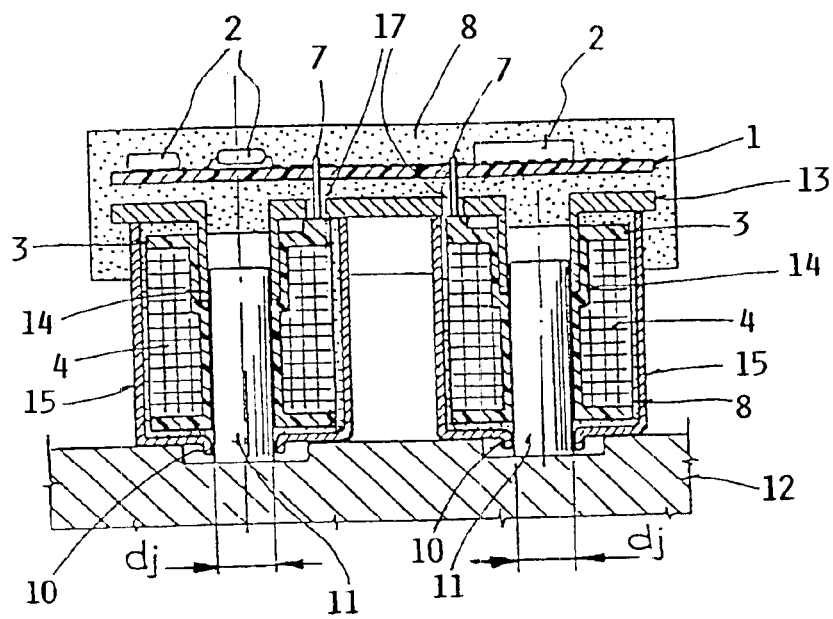
FIG. 5: Valve control device with yoke plate

FIG. 5 shows an embedded valve control device with yoke plate 13 and with the outline of a valve unit 12. In the compound 8, there is the circuit carrier 1, in particular a printed circuit board populated with the electronic components 2. At the same time spools are mounted on the circuit carrier 1, which feature a spool body 3 and windings 4. Between the circuit carrier 1 and the spools 5, a yoke plate 13 is located. The yoke plate 13 features insets 14 on to which the spool body 3 is pushed. The yoke plate 13, in this embodiment, has two functions. Mainly, it is used as a component part of the yoke, and, on the other hand, it also serves as a metal body to dissipate the heat from the power components mounted on the circuit carrier 1. The spools 5 connected to the yoke plate 13 and the circuit carrier 1 represent the electric magnets by means of which, the valves of valve unit 12 are operated via the valve dome 11. The electric spool connections 7, mounted on the side of the spool body 3, protrude into the printed circuit board 1. In this figure, two spools are shown that are facing each other so that their side-mounted spool connections 7 are located next to one another. This setup is particularly space-saving. The spools and the circuit carrier 1 are completely embedded, excluding the inside of the spool. In the inside of the spool, the interior spool body 3 is visible. The diameter $d_s$ on the inside of the spool is so large that it can be used to compensate the manufacturing tolerances during the manufacture of the valve unit, and the valve domes can be inserted easily into the valve control device during assembly. The external surfaces of the spool body 3 and the spool windings 4 are positively covered by the compound 8. This embedded arrangement protects all components, in particular the electronic components 2, against unfavorable environmental conditions such as e.g. water, humidity, and dust. The embedded components such as spools, circuit carrier 1, yoke plate 13, and electronic components 2 are fixed in position by the compound. The compound 8 itself provides the housing. In the area between the individual spools, recesses are provided into which the yoke bell 15 can be fitted after embedding. In comparison to the electronic components 2, yoke bell 15 is insensitive against any environmental influences and is subsequently fitted to the embedded and thus housed arrangement. The yoke bell 15, which is pushed either from above or below over the spool, is designed as a bell-shaped yoke and features a bead 10 to one side. The yoke inside diameter $d_j$ on the bead is smaller than the inside diameter $d_s$ of the cavity on the inside of the spool body. The bell-shaped yoke is made of thin sheet metal and flexible in itself. Here, on the cavity of the spool body 3 into which the valve dome 11 is later introduced, the bead 10 and the inset 14 of the yoke plate 13 are positioned centrally. Instead of the yoke bell 15, which completely encapsulates the spool winding 4, it is also possible to use a U-shaped yoke that does not cover the embedded spool winding on two sides. Furthermore, in addition to the valve control device, this figure also shows the hydraulic assembly 12, in particular the valve unit, whose valve domes 11 protrude into the spool body 5. Due to the manufacturing tolerances during the manufacture of the valve unit, the valve dome on the inside of the spool features a play. Before embedding the spools 5 have been connected with the circuit carrier 1 and the yoke plate 13. Here, the connection pins 7 of the spool bodies 3 do not only provide the electrical but also the mechanical connection, by means of which the circuit carrier 1 is at least partially positioned within the embedding tool. The positive connection between the valve body 3 and the inset 14 of the yoke plate 13 also provides a mechanical fixing during the embedding process.

After embedding the bell-shaped yoke or the U-shaped yoke is fitted externally on the housing as a further yoke component.

Figure 6:
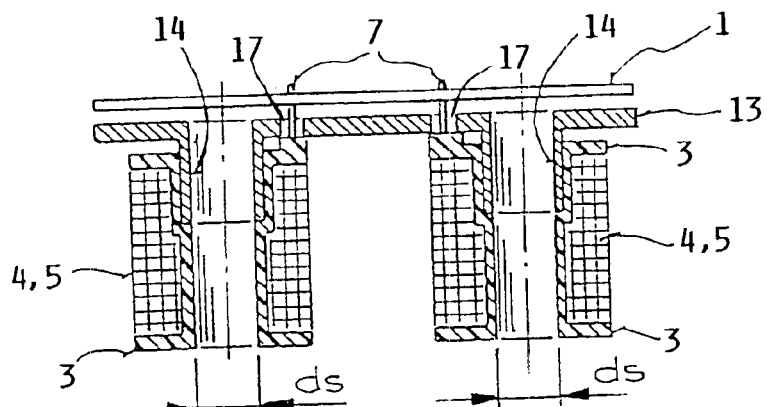
FIG. 6: Spool arrangement

FIG. 6 shows the spool arrangement with the circuit carrier and the yoke plate before embedding. The two spools 5 shown here each consist of a spool body 3, on which the spool windings 4 are mounted. The connections 7 of the spools 5 have not been fitted symmetrically with regard to the spool axis but mounted on one side. The spool connections 7 are inserted through apertures 17 of the yoke plate 13 into the boreholes of the circuit carrier 1, in particular the printed circuit board, and are then fixed in position by means of pressing forces or soldering. The yoke plate 13 is fixed in position by positively introducing the insets 14 of the yoke plate 13 into the spool body 3. Spool body 3, circuit carrier 1, and yoke plate 13 form a fixed unit and can be embedded together. Furthermore, there is a free space between the individual spools. The free space is used to create mounting space for the yoke bell which is not shown in this figure and which is pushed either from above or below over the spools after embedding.

Figures 7A, 7B:
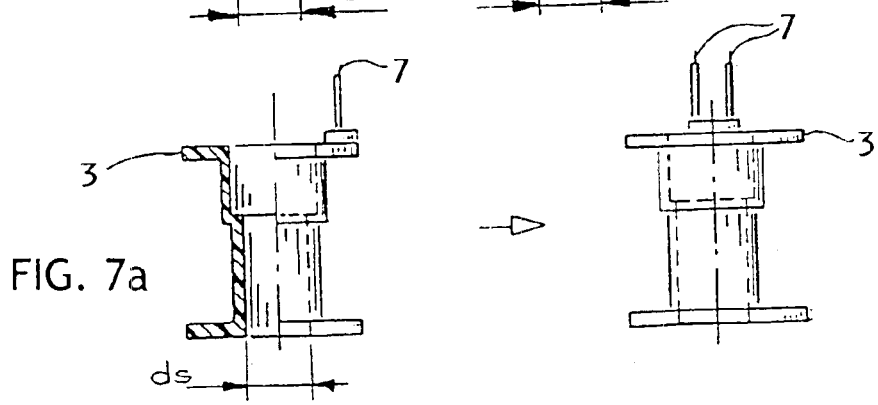
FIG. 7a: Side view, spool body
FIG. 7b: Front view, spool body

The FIGS. 7a and 7b show the spool body, in FIG. 7a as a side view, and in FIG. 7b as a front view. Here, the connections 7 are fed out to one side of the spool body 3. The connections 7 not only have the task to provide an electrical contact between the circuit carrier and the spool, but also support the printed circuit board—as shown in FIG. 6—during the embedding process. For this reason the connections 7 must be dimensioned such that they are sufficiently stable to be able to withstand the press-fitting or soldering processes, and to support the circuit carrier. Moreover, they must be arranged such that they do not obstruct the yoke bell. The cavity on the inside of the spool body 3 features different diameters. The smaller diameter $d_s$ on the one side of the cavity in the inside of the spool body must be selected to be sufficiently large so that the permissible tolerances, coming from the arrangement of the valve domes in the valve unit, can be compensated for. This takes account of the fact that the embedded spool bodies 3 with windings 4 will later be arranged in a fixed and immovable position in the compound 8. The larger diameter on the other side, together with the sheet thickness of the yoke plate insets, must again yield the smaller diameter. The spool body 3 consists of synthetic material.

The FIGS. 8a and 8b show the yoke bell in different perspectives, in FIG. 8a as a side view, and in FIG. 8b as a front view. As can be seen from the figures, the yoke bell 15 is designed as a pot-shaped yoke and features a bead 10 on one side, into which the valve dome is later inserted. The yoke bell 15 is pushed over the spool body as shown in FIGS. 7a and 7b. As the yoke bell 15, which consists of sheet metal, can only be mounted after embedding, this may also be located movably so that the interior diameter $d_j$ of the bead 10 does not need to compensate for all tolerances coming from the arrangement of the valve domes in the valve unit. Tolerance compensation is effected by means of the movability of the yoke bell 15.

Instead of a yoke bell, the FIGS. 9a and 9b show a U-shaped yoke 16 in different perspectives, in FIG. 9a as a side view, and in FIG. 9b as a front view. As shown in the figures, yoke 16 is U-shaped that is, it does not completely encapsulate the spool in the same way as the bell-shaped yoke but is open on two sides. This setup also features a bead 10 on one side, into which the valve dome is later inserted. The U-shaped yoke 16 is pushed over the spool body as shown in FIGS. 7a and 7b. As the U-shaped yoke 16, which consists of sheet metal, can only be mounted after embedding, this may also be located movably so that the interior diameter $d_j$ of the bead 10 does not need to compensate for all tolerances coming from the arrangement of the valve domes in the valve unit. Tolerance compensation is effected by means of the movability of the U-shaped yoke 16.

FIG. 10a shows the yoke plate 13 from below before assembly together with the other components and before embedding. The valve spools are pushed onto the circular insets 14. Next to the insets 14 there are apertures 17 to provide for the later feeding of the spool connections through the yoke plate to the circuit carrier. In order to illustrate more clearly the later setup, this figure also shows the plan view of the yoke bell 15 and the U-shaped yoke 16, which, respectively, together with the yoke plate, form the yoke for a spool.

FIG. 10b shows the cross-section view through the yoke plate. The metal yoke plate 13 features insets 14 which protrude from the yoke plate level. They are later introduced into the inside of the spool. The apertures 17 in the yoke plate 13 provide for the later making of the spool connections, which represent the electrical and mechanical connection to the circuit carrier.

In the case of all embodiments the housed valve control device is fitted into the motor vehicle, complete with the external yoke arrangement, as shown here and without the need for any further housing, and together with the valve unit. The housing of the valve control device consists of synthetic material.

What is claimed is:

1. An electromagnetic valve control device for controlling a valve unit that has a valve dome, said control device comprising:

a circuit carrier having control circuit components provided thereon;

an electromagnetic coil arrangement that is electrically connected to said circuit carrier, and that has an inner cavity adapted to receive the valve dome therein, and that is adapted to electromagnetically actuate the valve dome to control the valve unit;

a housing comprising a housing material that surrounds said circuit carrier and said electromagnetic coil arrangement; and a yoke arrangement located at least partially externally around said coil arrangement, wherein said yoke arrangement is mounted by itself from outside of said housing;

wherein said coil arrangement is embedded in, contacted by and surrounded by said housing material, and said yoke arrangement is located radially outwardly and at least partially around said housing material in which said coil arrangement is embedded, and said yoke arrangement is radially outwardly exposed.

2. The electromagnetic valve control device according to claim 1, wherein said housing material is an embedding compound, said circuit carrier and said coil arrangement are embedded in said embedding compound, and said yoke arrangement is mounted by itself from outside of said housing after said circuit carrier and said coil arrangement are embedded in said embedding compound.

3. The electromagnetic valve control device according to claim 1, wherein said yoke arrangement is and remains at least partially uncovered, unenclosed, and externally exposed.

4. The electromagnetic valve control device according to claim 1, wherein said yoke arrangement is arranged and remains movable relative to said coil arrangement.

5. The electromagnetic valve control device according to claim 4, wherein said coil arrangement includes a coil body having a coil body aperture therein forming said inner cavity, said yoke arrangement has a yoke aperture adapted to accept the valve dome extending therethrough, and said coil body aperture has a larger diameter than said yoke aperture.

6. The electromagnetic valve control device according to claim 1, wherein said yoke arrangement comprises a bell-shaped yoke extending entirely circumferentially externally around said coil arrangement.

7. The electromagnetic valve control device according to claim 1, wherein said yoke arrangement comprises a U-shaped yoke located only partially circumferentially externally around said coil arrangement.

8. The electromagnetic valve control device according to claim 1, wherein said yoke arrangement comprises a C-shaped yoke located only to one side of said coil arrangement.

9. A method of making the valve control device according to claim 1, comprising the steps:

a) electrically connecting said coil arrangement to said circuit carrier;

b) embedding said circuit carrier and said coil arrangement in said housing material consisting of an embedding compound to form said housing of said embedding compound; and c) arranging said yoke arrangement by itself at least partially externally around said coil arrangement after said step b).

10. The electromagnetic valve control device according to claim 1, wherein said housing material is a synthetic embedding compound, said housing consists of said synthetic embedding compound, said circuit carrier and said coil arrangement are embedded in said embedding compound that forms said housing, and said yoke arrangement is mounted by itself from outside of said housing after said circuit carrier and said coil arrangement are embedded in said embedding compound.

* * * * *

UNITED STATES PATENT AND TRADEMARK OFFICE
CERTIFICATE OF CORRECTION

PATENT NO. : 6,863,254 B2
DATED : March 8, 2005
INVENTOR(S) : Altenrenger et al.

It is certified that error appears in the above-identified patent and that said Letters Patent is hereby corrected as shown below:

<u>Title page,</u>
Item [73], Assignee, replace "Nuremburg" by -- Nuremberg --;
Item [57], ABSTRACT, delete and replace to read as follows:
-- An electromagnetic valve control device for controlling a valve unit includes a circuit carrier, an electromagnetic coil that is connected to the circuit carrier and that is adapted to receive and electromagnetically actuate a valve dome of the valve unit, a yoke arrangment located at least partially around the coil, and a housing made of a synthetic embedding compond that surrounds and embeds the circuit carrier and the coil. The yoke arrangment is mounted by itself from the outside of the housing after the housing is formed by embedding the other components in the embedding compound. --

Signed and Sealed this

Twenty-eighth Day of June, 2005

JON W. DUDAS
*Director of the United States Patent and Trademark Office*